UNITED STATES PATENT OFFICE.

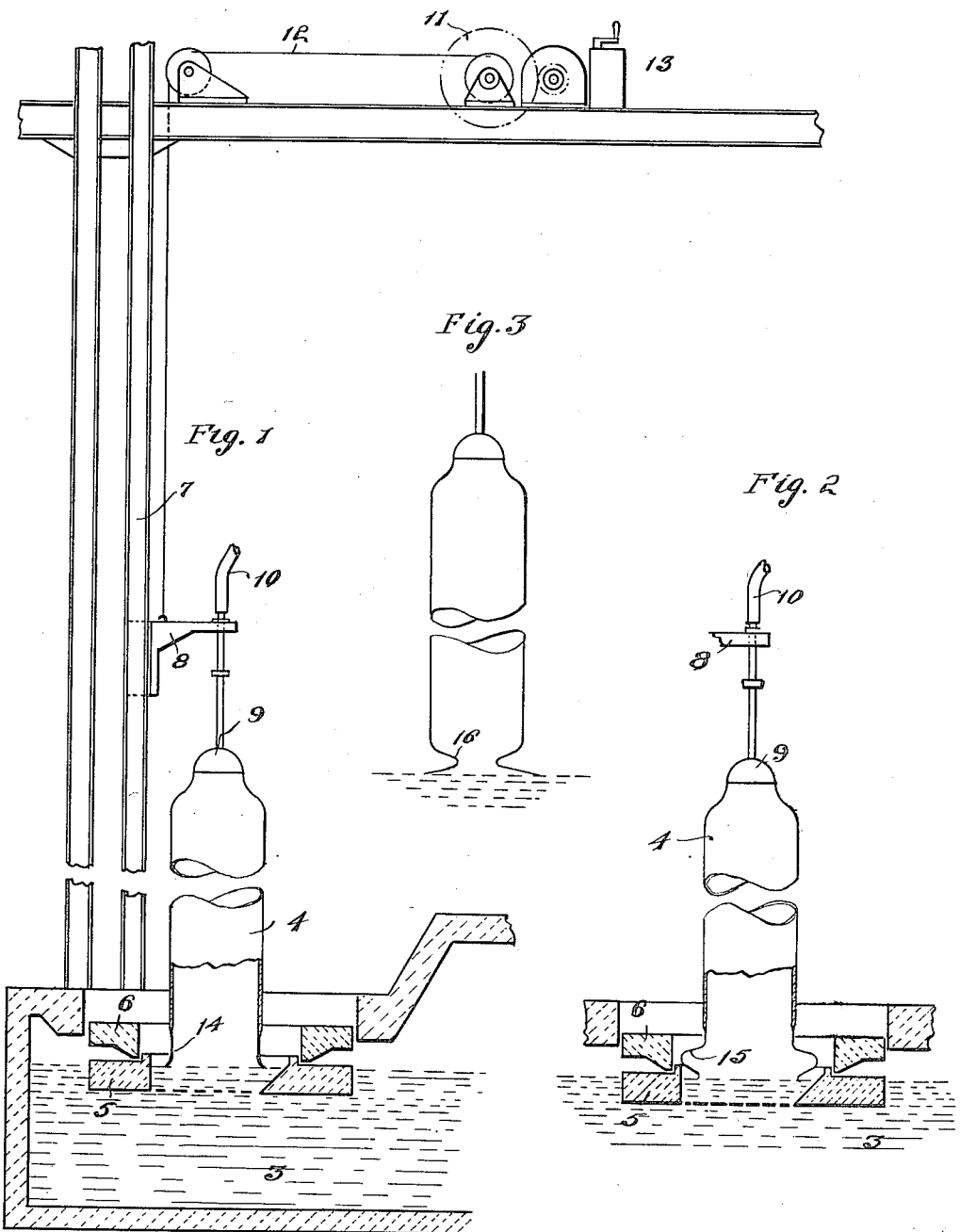

HALBERT K. HITCHCOCK, OF TARENTUM, PENNSYLVANIA, ASSIGNOR TO PITTSBURGH PLATE GLASS COMPANY, OF PITTSBURGH, PENNSYLVANIA, A CORPORATION OF PENNSYLVANIA.

METHOD OF DRAWING GLASS.

1,163,754.  Specification of Letters Patent.  Patented Dec. 14, 1915.

Application filed December 1, 1913. Serial No. 803,869.

*To all whom it may concern:*

Be it known that I, HALBERT K. HITCHCOCK, a citizen of the United States, residing at Tarentum, in the county of Allegheny and State of Pennsylvania, have invented a certain new and useful Method of Drawing Glass, of which the following is a specification.

The invention relates more particularly to the drawing of glass cylinders. It has for its object, the provision of an improved procedure for securing the separation of the lower end of the cylinders at the conclusion of the drawing operation. One embodiment of my invention is shown in the accompanying drawing, wherein—

Fig. 1 of the drawings indicates diagrammatically a drawing apparatus and the cylinder at one stage of the operation, Fig. 2 illustrates the cylinder at a later stage of the operation, and Fig. 3 indicates diagrammatically the separation of a cylinder by a modified method.

It has heretofore been the custom to secure the separation of the cylinders drawn from the body of molten glass, either by cutting off the cylinder by a shearing device, or by exposing the lower end of the cylinder to an extreme temperature, thus melting off its connection with the body of glass beneath. My method contemplates an improvement over this procedure, in that the manipulation of the drawing apparatus and the air supply secures the separation of the cylinder from the body of glass, without the use of any additional apparatus for severing or melting off the lower end of the cylinder.

Briefly stated, my process consists in increasing the speed of upward movement of the bait at the time when it is desired to detach the cylinder, which increase of speed thins the soft glass at the base of the cylinder and at substantially the same time securing an increased or decreased air pressure to the interior of the cylinder whereby the thinned portion of the cylinder is either swelled out and broken or fractured, or is caused to cave in and fracture, thus separating the cylinder from the body of glass beneath.

Figs. 1 and 2 illustrate roughly apparatus for carrying out the process, but it will be understood that the process is applicable with various classes of apparatus; and that the draw may take place from a large body of glass or from a relatively small body of glass such as might be contained in a drawing pot.

In the construction illustrated in Fig. 1, 3 is a body of molten glass from which the cylinder 4 is being drawn; 5 is the drawing ring at the surface of the molten glass; 6 is a vertically movable top stone; 7 is a framework upon which is mounted the vertically movable bait carrier 8; 9 is a bait which may be of any ordinary construction and to which air is supplied at any desired rate through the tube 10; 11 is an electric motor having a drum for winding up the cable 12 secured at its end to the carriage 8; and 13 is a controller for regulating the speed of the motor 11.

The drawing operation is conducted in the usual way until the cylinder has reached the desired length. During this drawing operation the bait has been moved upward by means of the motor, and a supply of air has been sent through the tube 10 and the hollow handle 9 to give the necessary pressure upon the interior of the cylinder. At the moment when it is desired to detach the cylinder the motor is speeded up by manipulation of the controller, or by any desired means, and this increased upward movement of the cylinder causes the glass at the lower end thereof as indicated at 14 to thin. At the same time a highly increased air pressure is applied through the tube 10 which causes the thinned portion at the lower end of the cylinder to bulge out as indicated at 15 in Fig. 2, forming a flange. This thin flange cooling rapidly and strain thereon being in a transverse direction, the glass is fractured. The upper wall of the flange or ring cools rapidly because of the thinness of the glass which radiates the heat rapidly upward, and because such upper wall is shielded by the lower wall of the flange from the heat from beneath.

The exact time as to the application of air pressure, the increase in the speed of draw, and the amount of increase of air pressure necessary to secure the desired result will necessarily vary, depending upon conditions, and it will be understood that the invention contemplates the use of any and all means for securing the variation in speed of draw and the variation in the air supply.

After the cylinder has been broken away from the parent bath of glass from the strains above alluded to, I cover the surface of the glass with a refractory covering and subject the surface to a reducing temperature, after which I preferably skim the surface preparatory to drawing the next cylinder.

In order to secure an inwardly projecting flange 16 as indicated in Fig. 3, the air pressure upon the interior of the cylinder is decreased instead of being increased. This may be accomplished by shutting off the supply of air through the bait as the drawing speed is increased, or by merely increasing the speed of draw without increasing the supply of air, or by applying suction to reduce the air pressure. In any case the reduction of air pressure tends to cause the cylinder to collapse and fracture at the point at which the glass is thinnest and weakest. It is also possible to detach the cylinder by merely increasing the speed of draw without changing the air pressure, or by sufficiently increasing or decreasing the air pressure without changing the speed of draw.

What I claim is—

1. The process of separating a glass cylinder drawn from a body of molten glass which consists in varying the air pressure in the cylinder so that a bulge is formed adjacent the point of draw with the walls thereof thinner than the walls of the cylinder and with the upper wall of the bulge shielded by the lower wall, and permitting the said upper wall to cool more rapidly than the lower wall whereby strains are induced and the glass fractured at the bulge.

2. The process of separating a glass cylinder drawn from a body of molten glass which consists in increasing the speed of draw and the air pressure in the cylinder so that a bulge is formed adjacent the point of draw with the walls thereof thinner than the walls of the cylinder and with the upper wall of the bulge shielded by the lower wall, and permitting the said upper wall to cool more rapidly than the lower wall whereby strains are induced and the glass fractured at the bulge.

In testimony whereof I have hereunto signed my name in the presence of the two subscribing witnesses.

HALBERT K. HITCHCOCK.

Witnesses:
JAMES C. BRADLEY,
ARCHWORTH MARTIN.